No. 706,618. Patented Aug. 12, 1902.
S. J. WEBB.
BALE PRESS.
(Application filed Feb. 23, 1901. Renewed Jan. 2, 1902.)
(No Model.) 2 Sheets—Sheet 1.
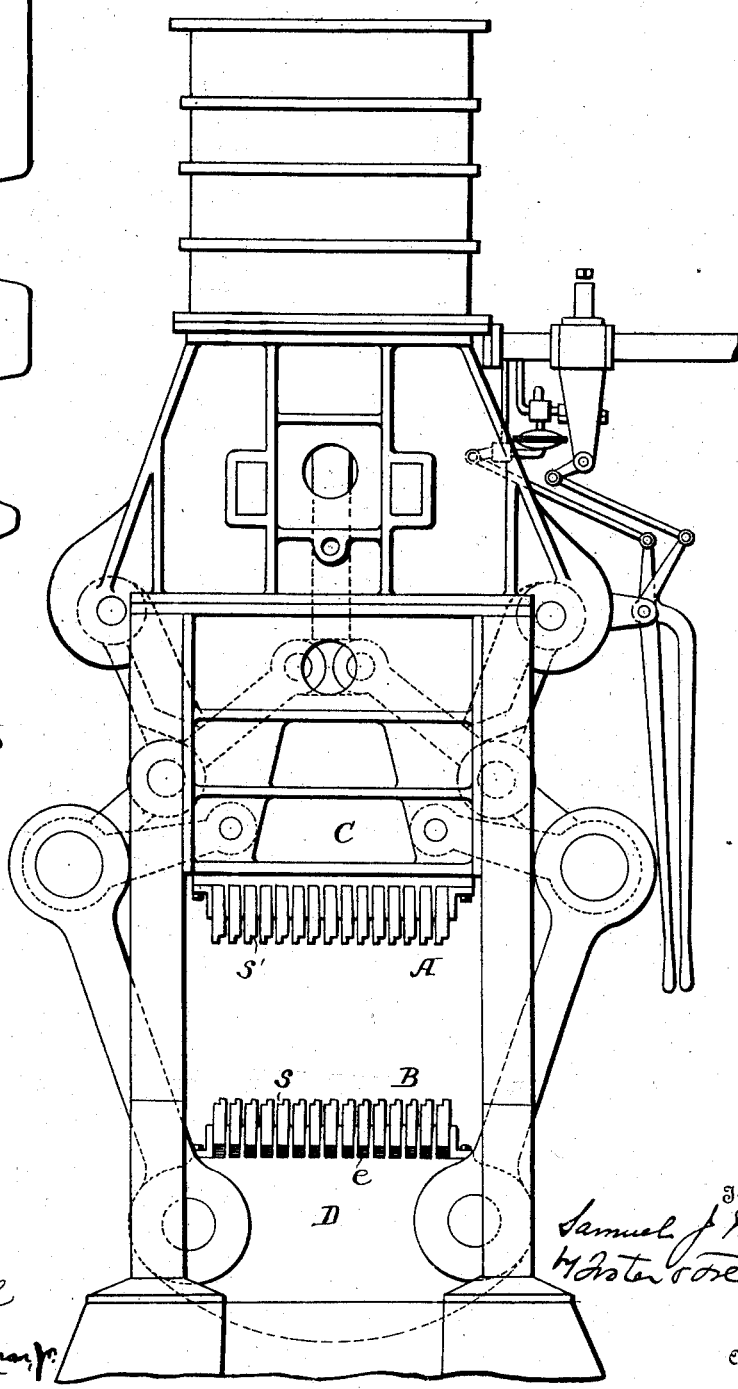

No. 706,618. Patented Aug. 12, 1902.
S. J. WEBB.
BALE PRESS.
(Application filed Feb. 23, 1901. Renewed Jan. 2, 1902.)
(No Model.)
2 Sheets—Sheet 2.
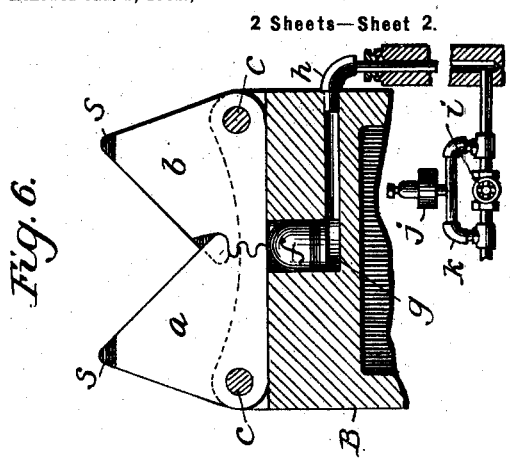
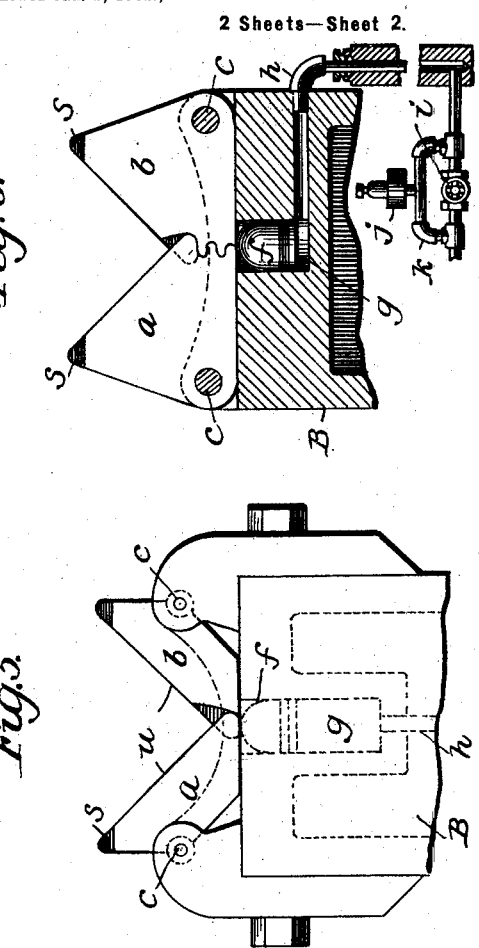
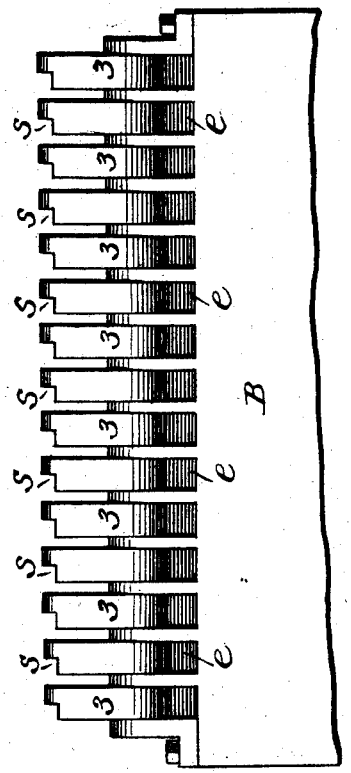
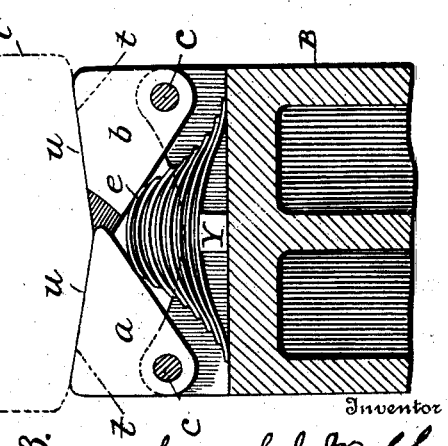
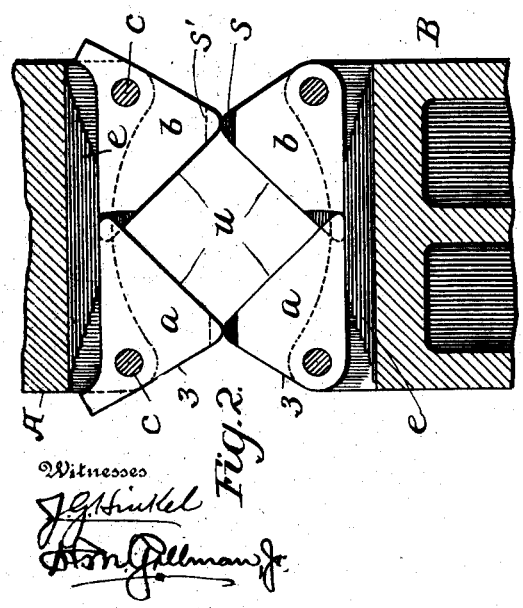
Inventor
Samuel J. Webb
By Foster Freeman
Attorneys
Witnesses

UNITED STATES PATENT OFFICE.

SAMUEL J. WEBB, OF MINDEN, LOUISIANA.

BALE-PRESS.

SPECIFICATION forming part of Letters Patent No. 706,618, dated August 12, 1902.

Application filed February 23, 1901. Renewed January 2, 1902. Serial No. 88,132. (No model.)

*To all whom it may concern:*

Be it known that I, SAMUEL J. WEBB, a citizen of the United States, residing at Minden, Webster parish, State of Louisiana, have invented certain new and useful Improvements in Bale-Presses, of which the following is a specification.

My invention relates to presses for pressing bales of cotton or other material; and it consists of a press provided with platens so constructed as to change the form or outline of the bale gradually from a rectangular shape with the upper and lower faces substantially horizontal to a rectangular shape in which there are two upper and lower faces substantially at right angles to each other, as fully set forth hereinafter and as illustrated in the accompanying drawings, in which—

Figure 1 is a front elevation of a cotton-bale press embodying my invention. Fig. 2 is an enlarged transverse sectional view showing the platens in position at the final compression of the bale. Fig. 3 is a cross-sectional view of one of the platens, showing the parts as arranged to receive the bale before compression. Fig. 4 is a side view of Fig. 3 looking in the direction of the arrow. Figs. 5 and 6 are sectional views illustrating modifications. Figs. 7 to 10 are diagrams illustrating the progressive changes in the outline of the bale.

My improved means for compression embodies platens so constructed that the bale is not only compressed vertically, but during such compression the side portions of the bale are compressed more rapidly and to a greater extent than the central portions, so that the side faces, which at the beginning are flat and vertical, are finally each changed to two side faces at right angles to each other. Thus, referring to the diagrams, Figs. 7 to 10, the bale at starting has the form shown in Fig. 7 and is compressed to a considerable extent without materially reducing its width, taking about the form shown in Fig. 8, and then on further pressure the sides are more rapidly compressed than the center, and the corners are forced in, the bale conforming to the outline shown in Fig. 9 and then gradually taking the outline shown in Fig. 10, so that each side face is converted into two faces substantially at right angles to each other.

The press may be constructed in different ways to secure these results, generally with platens each consisting of two pivoted or rocking members, the faces of which are nearly horizontal on starting, but gradually tilt downward at the center until they are nearly at right angles to each other.

I will now describe one construction embodying my invention.

The press is provided with opposite platen-supports A B, one of which may be a stationary part C of the frame, while the other a movable part D, with means for carrying the latter to and from the former, or both parts may be movable. This and other features of the press, independent of the platens, however, are immaterial. As shown, the construction of press is substantially that illustrated in my application Serial No. 38,023, filed November 28, 1900, and need not be further described. The two platens are alike, and instead of consisting each of a continuous plate, as usual, each platen consists of two sections *a b*, each of which may consist of a series of blocks or plates 3 3 3. Each section, whether in one or several parts, is pivoted to the fixed or movable part of the frame by a pivot pin or bar *c*, which is arranged nearest the outer end of the section, so as to afford the major leverage at the inner end for a purpose described hereinafter, and the pivot is also arranged back of or beyond the working face *u*, thereby securing a bell-crank leverage. The inner edges of the opposite sections may nearly meet, or they may be provided with teeth or fingers crossing each other and overlapping sidewise, as shown in the different figures of the drawings, and the opposite sections may be suitably connected to swing together—as, for instance, by means of gear-teeth *d*, Fig. 6. When the two parts of the platens are in their normal positions, adapted to have a bale placed upon the same, their working faces *u u* are approximately level with each other on a horizontal plane, and I provide any suitable means for normally supporting the parts in this position, preferably until the maximum pressure upon the bale is approximated, when the two sections will yield, their inner ends swinging downward until the working faces of the said sections are substantially at right angles to each other, as illustrated in Figs. 2, 5, and 6.

Any suitable means may be employed for securing the desired yielding resistance to the rocking of the two sections. As shown in Figs. 2, 3, and 4, there are springs $e$, in the form of leaf-springs, arranged beneath the different parts of the two sections and affording bearings for the inner edges thereof and of such strength that they will not materially yield until the maximum pressure is approximated. Instead of these springs the inner ends of the two sections may rest upon a plunger $f$, movable in a cylinder $g$, formed in the frame and to which water or other motor fluid passes under pressure through a pipe $h$, controlled by a valve $i$. This pressure will be sufficient to lift the inner ends of the sections when there is no pressure upon the same, and the valve $i$ is so adjusted that the fluid cannot be forced fully out of the cylinder until nearly the completion of the operation of compressing the bale.

If desired, a relief-valve $j$ may be arranged in a by-pass $k$. In case of excessive pressure it will rise and permit the fluid to pass back to the source of supply. Any other means of regulating the admission and flow of the fluid may be employed.

With the apparatus constructed as above set forth a bale is placed upon the lower platen—as, for instance, in the position shown by the dotted lines $v$, Fig. 3—and this bale may be wider than the face of the platen, for as the two platens are brought together upon the bale it is gradually forced with an increasing pressure upon the long arms of the levers constituting the sections, which are finally forced downward, causing the working faces $u\,u$ to tilt, the outer ends practically rising and swinging inward as the inner ends descend with an indrawing action that gradually carries the mass of the bale within the limits of the working faces of the platens, so that at the completion of operations the bale is completely confined between the four working faces $u\,u\,u\,u$ of the upper and lower platens, as shown in Fig. 2.

It will be seen that the action upon the bale is first to compress it by pressure applied to its longest diameter and that as the pressure upon the bale throughout increases the tilting of the platen-sections insures an increased pressure against the upper and lower faces nearest the outer edges to not only press them upward or downward, but also swing them inward until the desired change in cross-sectional form from a parallelogram resting on one edge is made to a parallelogram resting on one corner, with reduction in the dimensions of the bale vertically and horizontally, with a pressure practically applied radially in all directions from the center of the bale.

While I have described the faces $u\,u$ of each section as being substantially straight, of course it will be evident that they may be curved where it is desired to impart a rounded form to the bale.

In order to permit the bale to be further compressed and to reduce its dimensions in one direction diagonally, the corners of the sections may be cut away on the lines $t\,t$, as shown in Fig. 3, or they may be cut away to form a recess $s$ in one section and a corresponding recess $s'$ in the opposite section, thus permitting the sections to be brought closer together when the parts are in the positions shown in Fig. 2 than otherwise would be possible.

The sections, as shown in Figs. 1, 2, 3, 4, and 6, are approximately triangular in shape; but this shape is not material, as they may be in the form in cross-section of a truncated pyramid, as shown in Fig. 5.

When the press is to be used for compression in the ordinary manner, any suitable support may be placed beneath the inner ends of the sections to prevent them from swinging downward. Thus a bar Y may be placed beneath the springs $e$ of each platen, when the operation of the press will be the same as usual.

It will of course be understood that each platen-section has grooves for the passage of the bands, or when the sections consist of separate blocks, as in Figs. 1 to 4, the bands may be passed between the blocks, the ties generally being secured at the outer corners of the bale.

Without limiting myself to the precise construction and arrangement of parts shown, I claim as my invention—

1. In a bale-press, the combination of upper and lower platens, and means for moving the platens to and from each other, with means whereby the pressure at each side of each platen is changed from a vertical to an inclined direction to first compress the whole bale vertically and thereafter to compress the side portions of the bale to a greater extent than the central portion until two faces at about right angles to each other are formed at each side, substantially as described.

2. The combination in a bale-press, of means for applying pressure first vertically to reduce the height of a bale, and devices whereby to thereafter compress the side portions to a greater extent than the center until each side portion is brought to conform to two faces substantially at right angles to each other, substantially as described.

3. A press having upper and lower platens, each platen consisting of sections pivoted to the platen-support nearest the outer ends and extending inward toward each other, and means for maintaining the sections normally with their working faces approximately in the same horizontal plane but capable of yielding under high pressure to permit the sections to gradually assume a position with their faces at right angles to each other as the pressure is completed, substantially as described.

4. The combination in a press-platen, of two sections pivoted nearest their outer ends and back of their working faces, means for supporting and maintaining the sections normally with their working faces in approximately a horizontal plane, and means for permitting the sections to yield under heavy pressure until their working faces are at right angles to each other, substantially as described.

5. A press-platen, consisting of two rocking sections pivoted nearest their outer ends to assume positions with their working faces either approximately on a horizontal plane or at right angles to each other, and yielding means arranged to normally maintain the sections with their faces horizonal, substantially as described.

6. The combination with the platen-supports of a press, of sections pivoted thereto to present substantially flat faces to the bale at the beginning of the pressure and to present faces at a right angle as the pressure is completed, substantially as described.

7. The combination with the platen-supports of a press, of sections pivoted to present substantially flat faces to the bale at the beginning of the pressure and to present faces at a right angle as the pressure is completed, with means for resisting the movement toward the final position, substantially as described.

8. The combination with the platen-supports of a press, of sections pivoted thereto to present substantially flat faces to the bale at the beginning of the pressure and to present faces at a right angle as the pressure is completed, with springs for resisting the movement toward the final position, substantially as described.

9. The combination in a press, of a press-platen having rocking sections pivoted to rock as the platens are brought together, and yielding means for resisting the rocking movement, substantially as described.

10. The combination in a press, of a press-platen having rocking sections pivoted to rock as the platens are brought together, and yielding means for resisting the rocking movement constructed to prevent such movement until the maximum pressure is approximated, substantially as described.

11. The combination in a press-platen, of two pivoted sections connected to rock together, and means for resisting the rocking motion, substantially as described.

12. The combination in a press-platen, of two sections each consisting of a series of independent sectors pivoted to assume positions with their faces approximately horizontal or at right angles, and means for supporting the sectors yieldingly with the working faces in horizontal position, substantially as described.

In testimony whereof I have signed my name to this specification in the presence of two subscribing witnesses.

SAMUEL J. WEBB.

Witnesses:
 W. CLARENCE DUVALL,
 H. M. GILLMAN, Jr.